M. Shimer.
Grain Winnower.
Nº 10,494.    Patented Feb. 7, 1854.
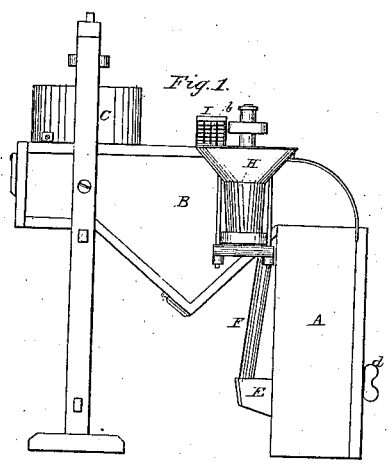
Fig. 1.
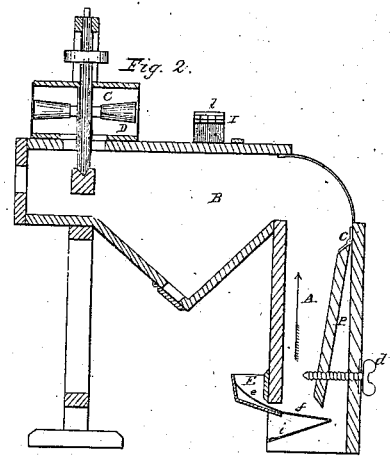
Fig. 2.
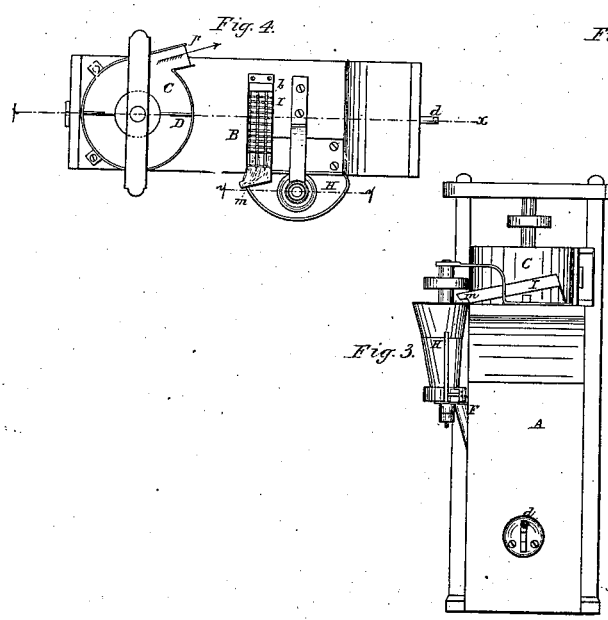
Fig. 4.
Fig. 3.
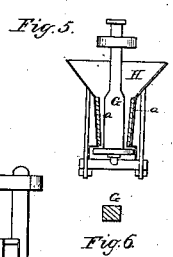
Fig. 5.
Fig. 6.
THE NORRIS PETERS CO., WASHINGTON, D. C.

UNITED STATES PATENT OFFICE.

MICHAEL SHIMER, OF UNION TOWNSHIP, BEDFORD COUNTY, PENNSYLVANIA.

WINNOWER.

Specification of Letters Patent No. 10,494, dated February 7, 1854.

*To all whom it may concern:*

Be it known that I, MICHAEL SHIMER, of Union township, in the county of Bedford and State of Pennsylvania, have invented a new and useful Improvement in Winnowing-Machines; and I do hereby declare that the following is a full, clear, and exact description of the construction and operation of the same, reference being had to the annexed drawings, forming part of this specification, in which—

Figure 1 is a side elevation of the machine. Fig. 2 is a vertical longitudinal section taken on line $x\,x$, Fig. 4. Fig. 3 is an end elevation of the machine. Fig. 4 is a top view of the winnower, with top of fan chamber removed. Fig. 5 is a vertical section on line $y\,y$ of Fig. 4. Fig. 6 is a cross section of the rubber G.

Similar letters of reference in the several figures denote the same part of the machine.

My invention refers to machines in which the chaff and impurities are separated and drawn off by the current due to the revolution of a fan; which cleaning process is well known to be influenced materially by the form of the draft passages, and regulation of the blast.

The invention consists in the introduction of an adjustable side to the vertical trunk; by which the draft is rendered sufficiently strong when passing through the grain, for the separation of impurities, while its gradual weakening due to the enlargement of the trunk prevents the carrying off of the cleaned grain; also, in the employment of a ribbed hopper and beater shaft, for loosening the white caps and other adhering impurities before submitting the grain to the action of the fan blast.

In the drawings A is the vertical trunk communicating with the hopper shaped trunk B, on, and opening into which is the fan chamber C, containing the fan D. On the side of the trunk B is the hopper H with its bottom communicating by the tube F with the hopper E; on the interior of this hopper H are the ribs $a$, and within it revolves the square rubber G, the lower end of which is provided with a flange $r$, the edge of which extends under the lower edge of the hopper H, as seen in Fig. 6, and serves to prevent the grain from falling through the hopper until all of the impurities in the grain have been thoroughly mashed or ground. Upon the top of the machine is the inclined trough I covered with the screen $b$ and leading into the hopper H. Within the vertical trunk A, and equal in width to its interior, is the movable side P, hung by the hinges $c$, and adjustable by the screw $d$. The hopper E has an inclined bottom $e$ leading to the seive $f$, below which is the cockle seive $i$.

The operation of my machine is as follows: The grain to be operated upon, passes by the inclined trough I to the hopper H, the screen $b$ causing the large impurities to pass off by the upper plate $m$ of the trough. After entering the hopper H the friction between the ribs $a$ and revolving rubber G, removes the white caps and other adhering impurities. From the hopper H the grain proceeds by the tube F to the hopper E and thence to the seive $f$, where the current caused by the revolution of the fan D passes through the grain and carries off the chaff and lighter impurities as indicated by the arrow in Fig. 2. The heavier of these impurities fall into the hopper B while the chaff and light particles pass out through the opening $p$ in the fan chamber. After passing through the seive $f$ the cockle is separated by the sieve $i$ and the grain is conveyed to the proper receptacle perfectly cleaned.

Previous to commencing the operation, the side P must be adjusted by the screw $d$ to suit the cleaning to be performed; so that the full strength of the blast shall be felt at the screen $f$ to insure the separation, while its gradual weakening prevents the grain from being carried off.

The advantages of this machine consist in the superiority of the adjustable side over permanent trunks widening upward, as the strength of the blast should be varied according to the kind of grain submitted to the process, and the amount of cleaning required, which adjustment when the sides of the trunk are stationary cannot be accomplished with the facility and effectiveness of the mode under consideration; also, in the employment of the hopper H and the arrangement by which the grain is conveyed within the influence of the blast, the rubbing first received in the hopper separating all adhering impurities, and rendering the grain capable of being thoroughly cleaned when it reaches the correctly graduated blast of the machine.

I do not claim the adjustable side P alone. But

What I do claim as my invention and desire to secure by Letters Patent is—

1. The movable side P in combination with the inclined screen F, said combination subserving three purposes, 1st, for preventing the grain from passing over the edge of the screen until it has been properly presented to the blast or draft; 2nd, for partially cutting off the draft as the state of the grain may require; 3rd, for expanding the draft of the blast as it ascends the trunk so as to weaken the force of the blast in such a manner that the pure grain will not be carried over into the horizontal part B of the trunk.

2. I claim the square rubber G in combination with the circular flanch formed on its lower extremity as described for the purpose of mashing or grinding all impurities softer than the wheat, and also for preventing the grain from passing out of bottom of the hopper before it has been thoroughly pulverized, as described.

In testimony whereof, I have hereunto signed my name before two subscribing witnesses.

MICHAEL SHIMER.

Witnesses:
SAMUEL H. TATE,
W. T. CHAPMAN.